(12) United States Patent
Shaham et al.

(10) Patent No.: US 11,301,178 B2
(45) Date of Patent: Apr. 12, 2022

(54) STITCHING FRAMES INTO WHICH IMAGE HAS BEEN SUBDIVIDED ALONG LENGTH OF IMAGE

(71) Applicant: HP INDIGO B.V., Amstelveen (NL)

(72) Inventors: Noam Shaham, Ness Ziona (IL); Ram Dagan, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 483 days.

(21) Appl. No.: 16/332,444

(22) PCT Filed: Sep. 16, 2016

(86) PCT No.: PCT/EP2016/072025
§ 371 (c)(1),
(2) Date: Mar. 12, 2019

(87) PCT Pub. No.: WO2018/050246
PCT Pub. Date: Mar. 22, 2018

(65) Prior Publication Data
US 2021/0279011 A1    Sep. 9, 2021

(51) Int. Cl.
*G06F 3/12*    (2006.01)

(52) U.S. Cl.
CPC ............ *G06F 3/1206* (2013.01); *G06F 3/126* (2013.01); *G06F 3/1241* (2013.01)

(58) Field of Classification Search
None
See application file for complete search history.

(56) References Cited

U.S. PATENT DOCUMENTS

| | | |
|---|---|---|
| 6,331,860 B1 | 12/2001 | Knox |
| 6,856,421 B1 | 2/2005 | Amir et al. |
| 7,154,515 B2 | 12/2006 | Donahue et al. |
| 7,271,822 B2 | 9/2007 | Towner |
| 7,388,686 B2 | 6/2008 | Saquib et al. |
| 2014/0362173 A1 | 12/2014 | Doepke et al. |
| 2015/0213339 A1 | 7/2015 | Sawada |

OTHER PUBLICATIONS

Wide Format Print, < http://www.newnorth.co.uk/wide-format-print/ > Retrieved from the Internet on Mar. 6, 2016.

*Primary Examiner* — Lennin R Rodriguezgonzalez
(74) *Attorney, Agent, or Firm* — Michael A Dryja

(57) ABSTRACT

A method is described in which a length of an image is compared with a threshold associated to a print device. The image is subdivided into a sequence of print frames. Each print frame has length equal to or less than the threshold. A stitching operation is performed on at least two consecutive print Compare a length of an image with a threshold frames. The print device is controlled to sequentially print the at least two stitched consecutive print frames.

15 Claims, 12 Drawing Sheets

- print frame #1: $A + B\alpha$
- print frame #2: $B\alpha^{-1} + C + D\alpha$
- print frame #3: $D\alpha^{-1} + E + F\alpha$
- print frame #4: $F\alpha^{-1} + G$

STITCHING FRAMES INTO WHICH IMAGE HAS BEEN SUBDIVIDED ALONG LENGTH OF IMAGE

BACKGROUND

Print engines such as print presses are in general input with images to be printed. When several images are requested to be printed, they may be memorized in storage units. A controller may manage a queue of images to be printed. Images have a format which is accepted by the print engine for performing the print job. The format of the images may be subjected to constraints which may be implied by physical characteristics of the print engines.

DETAILED DESCRIPTION

Hereinafter, examples are mainly directed to printing systems and methods, e.g., using ink-jet printers, electrophotographic printers, laser printers, and xerographic printers.

Figure 1:
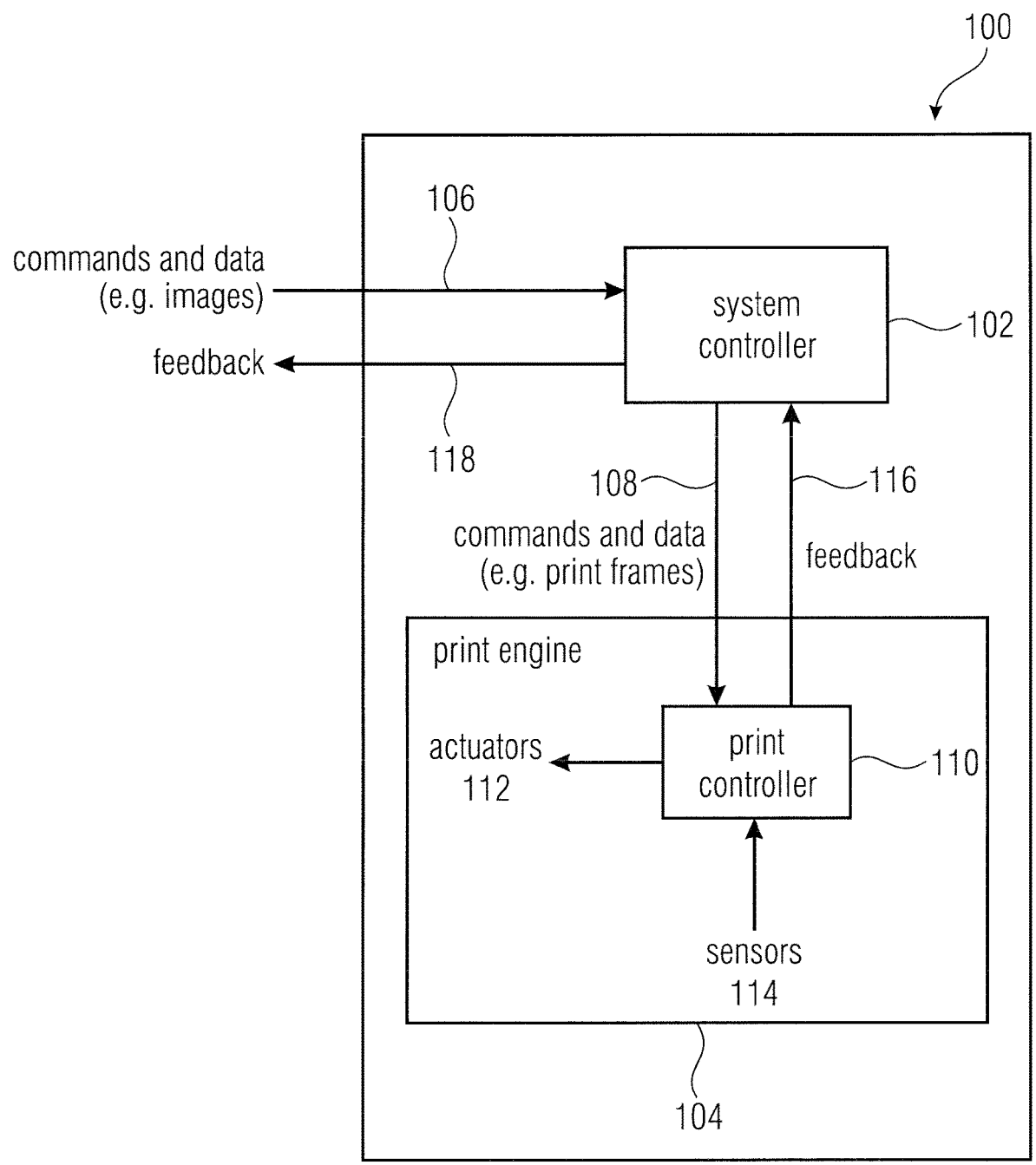
FIG. 1 is a schematic diagram showing a print system according to an example.

FIG. 1 shows an example of print system 100 which may comprise a system controller 102 and a print engine 104 (e.g., a print press). The system controller 102 may manage print requests from a user, e.g., via a user interface, software such as a typographical application or a page composition application, or a remote application. Commands and/or data, such as an image or a sequence of images 106, may be provided to the print engine 104. The system controller 102 may request the print of the images by outputting commands and/or data. In particular, the data may comprise requests of print jobs, such as images or sequences of images. Images and sequences of images have a format which is accepted by the print engine 104, e.g., a print frame 108. The print engine 104 may be controlled by a print controller 110, which manages the print of the print frames. The print engine 104 may control actuators 112 and obtain an input, such as a feedback input, from sensors 114. The print controller 110 may also provide feedback (e.g., notifications or alarms) 116 to the system controller 110, which in turn may transmit feedback 118 to the user. In some examples, the system controller 102 and the print controller 110 may be incorporated in the same controller, e.g., in a single processor.

An image may be a representation of pixels, each having a value (e.g., color values such as a Red-Green-Blue, RGB, values or a Cyan-Magenta-Yellow-Black, CMYK color values, intensity values, etc.). An image may correspond to a matrix. Each entry of the matrix may correspond to a pixel or a group of pixels. Rows and columns of the matrix may correspond to pixel lines or pixel-group lines in a length and width direction, respectively, or vice versa. Each entry of the matrix may correspond to a pixel value which may be a scalar or a tuple, e.g., represented in the form (C, M, Y, K). An image may be subdivided into a plurality of portions, each of which is, in turn, an image. In this case, the resulting matrices may have less rows or less columns than the original image. It is also possible to compose images to each other, so that the matrix associated to the resulting composed image may have less rows or less columns than the original images.

The system controller 102 or the print controller 110 may subdivide the image or a composition of images into a sequence of print frames, each having a length equal to or less than a particular threshold. The threshold may be due to the physical characteristics of the print engine, such as the presence of press seams, the length of a blanket belt, the circumference of the imaging drum, and so on. The threshold may also be due to the data format accepted by a printer, which may be limited. The threshold may also be due to scarcity of computing resources, such as memory for storing data.

Figure 2A:
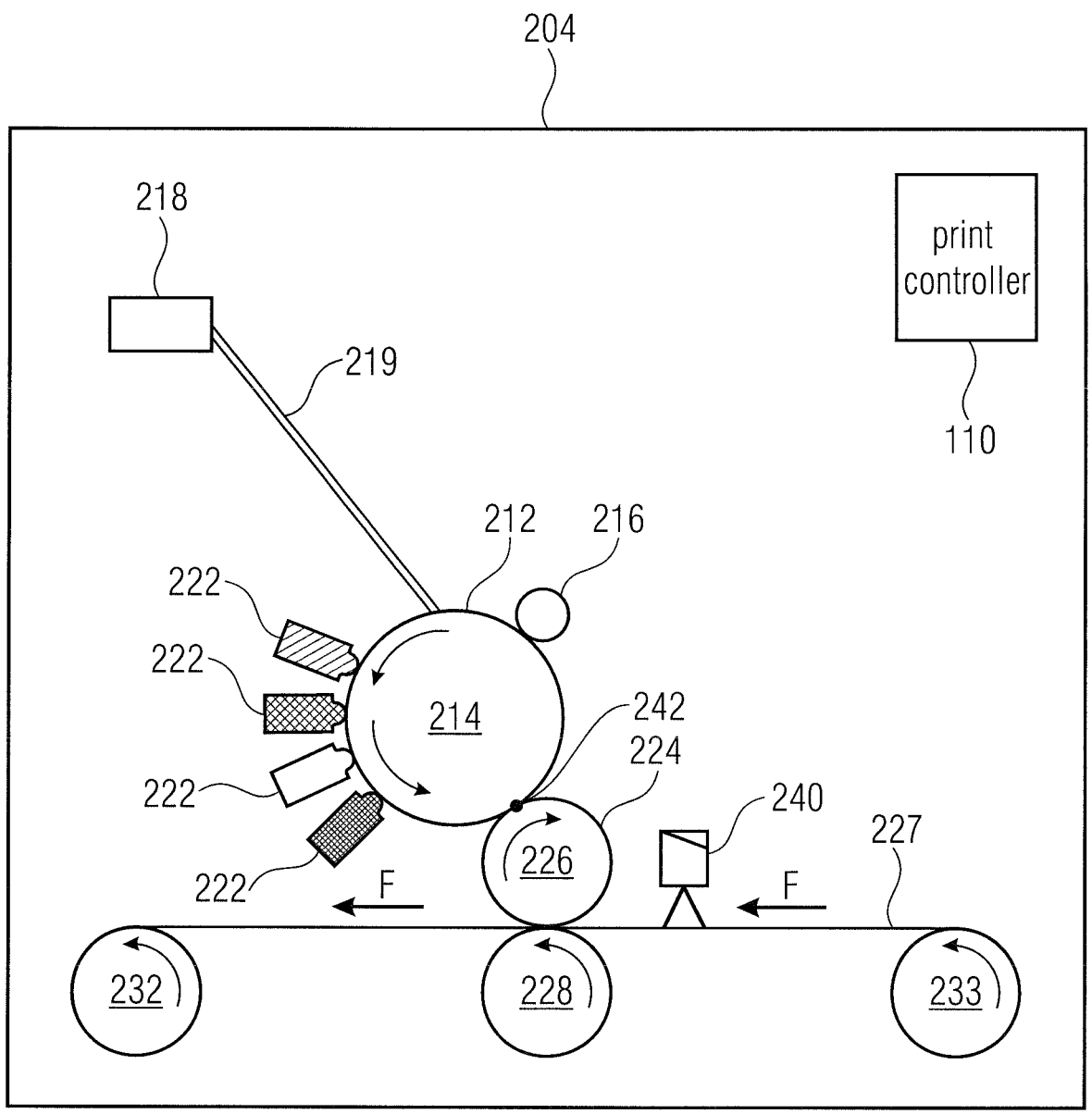
FIGS. 2a and 2b show print engines according to examples.

FIG. 2a shows an example of laser print engine (print device) 204 which may be an example of the print engine 104. The print engine 204 may include a photo imaging component, such as a photoreceptor (image plate) 212 mounted on a photoreceptor/imaging drum/cylinder 214. The photoreceptor 212 may define an outer surface of the imaging drum 214 on which images are formed. A charging component such as charge roller 216 connected to electrical power units (not shown) may generate electrical charge that flows toward the photoreceptor surface and cover it with a uniform electrostatic charge. A laser imaging unit (writing head) 218 may selectively expose the photoreceptor 212 with a laser beam 219, in particular exposing image areas on the photoreceptor 212 and dissipating (neutralizing) the charge in some areas. Exposure of the photoreceptor 212 in this manner creates a 'latent image' in the form of an invisible electrostatic charge pattern that replicates the image to be printed.

After the latent electrostatic image is formed on the photoreceptor 212, the image may be developed by color stations or binary ink developers (BIDs) 222 to form an ink image on the outer surface of the photoreceptor 212. Each BID 222 may include rollers that facilitate the development of ink to the latent electrostatic image. The print controller 110 may control the application of printing voltages to the BID 222 to create electric fields between the BID 222 and photoreceptor 212 that enable the development of ink to the latent electrostatic image. Each BID 222 may develop one ink color of the image, and each developed color may correspond with one image impression or color separation. While four BIDs 222 are shown, indicating a four color process (i.e., a CMYK process), other press implementations may include additional BIDs 222 corresponding to additional colors.

According to an example, in a first image transfer, a single color separation impression of the ink image developed on the photoreceptor 212 may be transferred from the photoreceptor 212 to an image transfer blanket 224. The image transfer blanket 224 may be wrapped around and securely fastened to the outer surface of an intermediate transfer member (ITM) drum 226. The first image transfer that transfers ink from the photoreceptor 212 to the print blanket 224 is driven by an applied mechanical pressure between the imaging drum 214 and the ITM drum 226, and electrophoresis of the electrically charged ink particles. The electric field that drives the ink transfer may be created by a bias voltage applied to the print blanket 224.

The print blanket 224 may be heated by both internal and external heating sources such as infrared heating lamps (not shown), e.g., under the control of the print controller 110. The heated print blanket 224 may cause most of the carrier liquid and solvents in the transferred ink image to evaporate. The heated blanket 224 may also cause particles in the ink to partially melt and blend together. This results in a finished ink image on the blanket 224 in the form of a hot, nearly dry, tacky plastic ink film.

In a second image transfer, the hot ink film image impression may be transferred from the blanket 224 to a substrate 227 such as a sheet of print media (e.g., paper). The substrate 227 may be held or supported by an impression (IMP) drum/cylinder 228. Contact pressure between the ITM drum 226 and IMP drum 228 may compress the blanket 224 against the substrate 227 to facilitate the transfer of the hot ink film image. The temperature of the substrate 227 is below the melting temperature of the ink particles, and as the ITM drum 226 and IMP drum 228 rotate against one another under pressure, the hot ink film comes into contact with the cooler substrate 227 and causes the ink film to solidify and peel off from the blanket 224 onto the substrate 227.

The substrate 227 may be fed in the direction of the length of the substrate 227, which may be along a feeding direction F. Rollers 232 and 233 and/or the IMP drum 228 may be used for feeding. Motor units, which may be controlled by the print controller 110, may be used to drive the movements.

The process may be repeated for each color separation in the image. E.g., in a 4-shot printing process the colors accumulate in successive revolutions on the substrate 227 wrapped on the IMP drum 228 until all the color separation impressions (e.g., C, M, Y, and K) in the image are transferred to the substrate 227. After all the color impressions have been transferred to the sheet of substrate 227, the printed sheet of the substrate 227 may be transported along the feeding direction. In a 1-shot printing process, the color separations accumulate on the print blanket 224 and are transferred to the print media at one time after all the color separations have been transferred to the blanket 224.

Elements such as the laser imaging unit 218, the BIDs 222, and the electric devices (not shown) which control the printing voltages applied to the BIDs 222 may be some of the actuators 112 which are controlled by the print controller 110. Also motor units which drive the rotation of at least some of the imaging drum 214, the ITM drum 226, and IMP drum 228 may be actuators 112 which controlled by the print controller 110.

The print controller 110 may also be connected to input devices, as the sensor devices 114, for example thermometers, to monitor physical variables such as temperature.

FIG. 2a also shows a press seam (seam region) 242 on the photoreceptor 212. A maximum length threshold (bounded to the circumference of the imaging drum 214) for a print frame to be printed without seam may be therefore intrinsically defined. Other thresholds (e.g., lower thresholds) may be also defined.

Figure 2B:
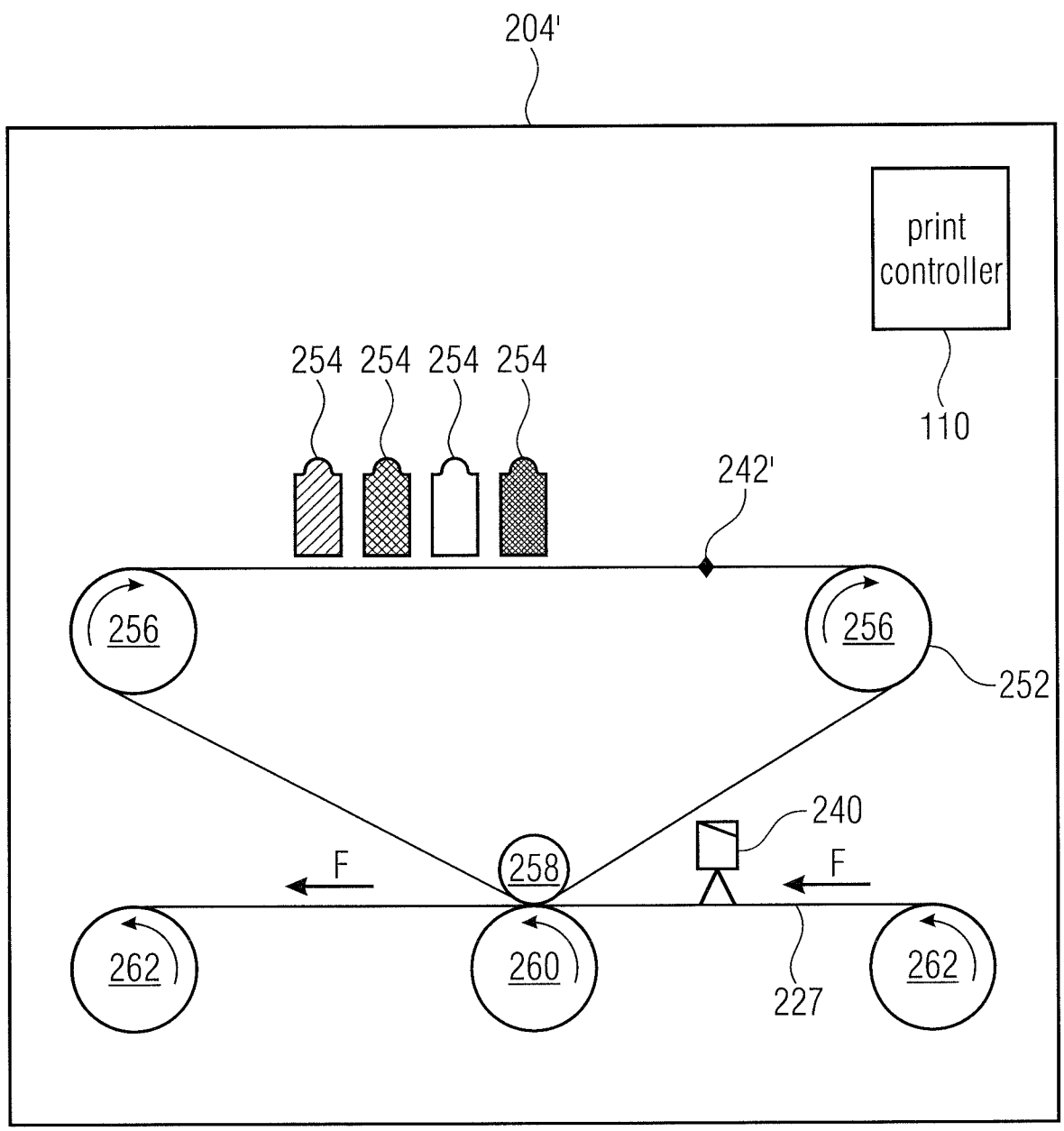

FIG. 2b shows an example of ink-jet print engine (print device) 204' which may be an example of the print engine 104. A blanket belt 252 may be impinged by ink applied by nozzles of ink-jet color stations 254. The blanket belt 252 may be moved by rollers 256 to transfer the impinged color onto a substrate 227. In particular, a contact pressure between the drum 258 and an impression (IMP) drum 260 may compress the blanket belt 252 against the substrate 227 to transfer the image. After the color impressions have been transferred to the substrate 227, the substrate 227 may be moved along a feeding direction (direction of the length of the substrate), e.g., by rollers 262 and/or the IMP drum 260. Motor units may be implemented to drive the rotation of the drums and rollers and the consequent movement of the substrate. The print controller 110 may control the motor units.

Some of elements such as the color stations 254 and the motor unit rotating the rollers 256 and 262, and the drums 258 and 260 may be examples of actuators 112 controlled by the print controller 110.

FIG. 2b also shows a seam region 242' on the blanket belt 252. A maximum length threshold (which may be bounded to the length of the blanket belt 252) for a print frame to be printed without involving the seam region 242' may be therefore intrinsically defined.

Both the print engines 204 and 204' may comprise, among sensors 114, a mark detector 240, which may recognize marks which have been applied (e.g., printed, labelled, or engaged) to the substrate 227. The mark may be applied, for example, to a sacrificial portion of the substrate 227 which may be subsequently separated e.g., by a cutting device. The mark detector 240 may be a visual sensor, such as video-camera, a CCD, etc., which may acquire visual data and detect the mark from an image of the substrate 227. It is also possible to provide a marking device which marks the substrate 227 (e.g., with ink or label) so that the mark detector 240 recognizes the presence of the mark on the substrate 227. The marking device may also be the print engine: it may be configured to print the mark in a recognizable format on the substrate 227. The mark may also be hidden in the images, e.g., encrypted between the printed pixels, preventing a human eye from recognizing it. In this case, the mark detector 240 or the print controller 110 may also implement decrypting algorithms to detect the presence of the mark between the visual data acquired by imaging the support.

As may be seen from FIGS. 2a and 2b, the substrate 227 is forced to move in its length direction so as to translate along the feeding direction F. The feeding direction F are in FIGS. 2a and 2b is from right towards left. The thickness of the substrate 227 is in vertical direction in FIGS. 2a and 2b, so that images are impressed on the substrate 227 from top to bottom. The mark detector 240 may be placed upstream to the position of the image transfer in the feeding direction F. For example, the mark detector 240 may be placed before elements 226 and 228 of the print engine 204 or before elements 260, 258 of the print engine 204'.

The mark detector 240 or the print controller 110 may have the capability of measuring the distance of the detected mark from the position of the image transfer. It is also possible, in some examples, to provide a positioning unit which allows the automatic or manual selection the position of the mark detector 240 in the length (feeding) direction F, so as to set the distance of the mark detector 240 from the position of the image transfer.

Figure 3:
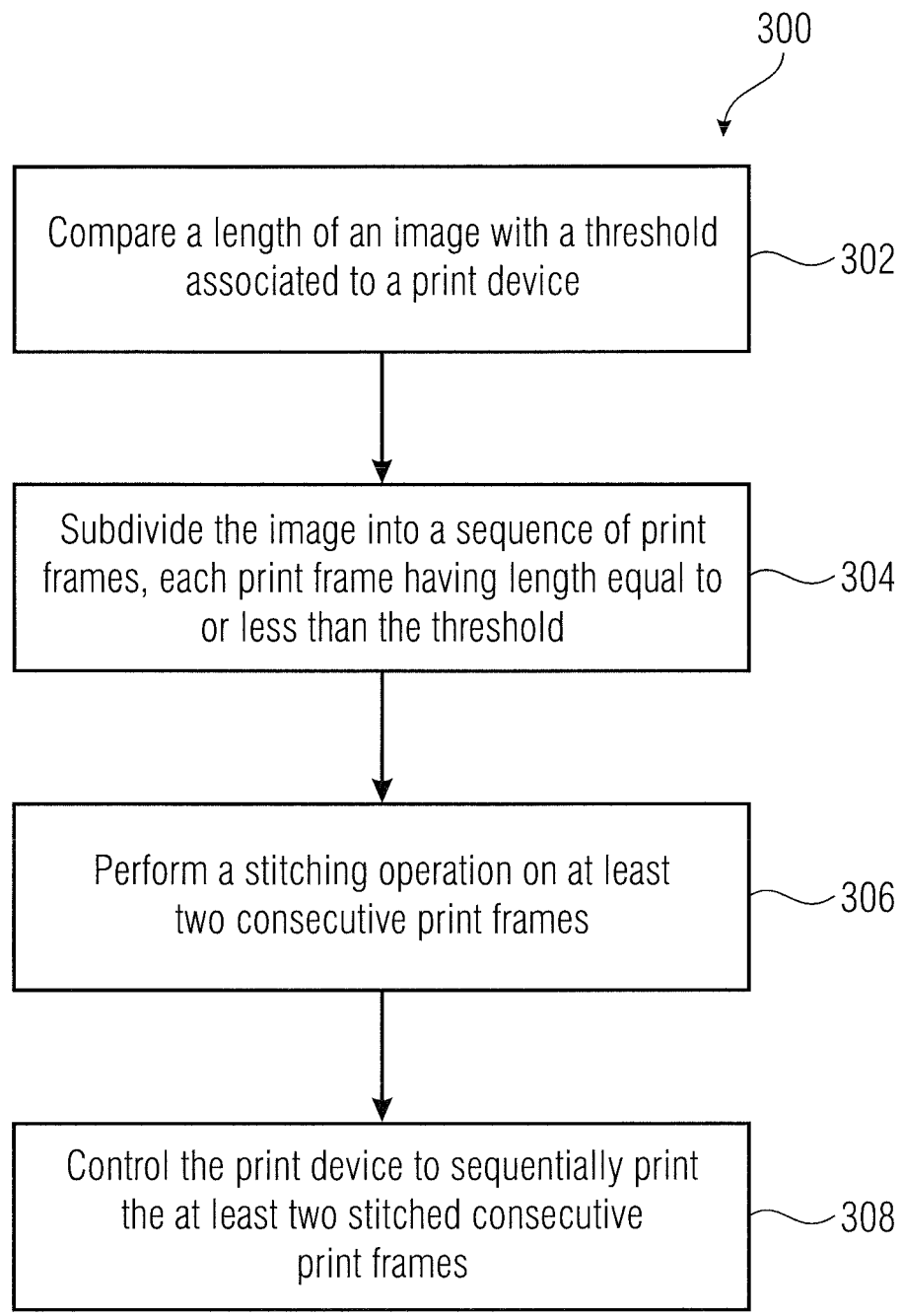
FIG. 3 shows an example of method for controlling a print according to an example.

FIG. 3 shows a method 300 to control a print, e.g., using the systems 100 or one of the print engine 204 or 204'.

When an image (or a plurality of images composed in sequence) is input, e.g., to the system controller 102, the length of the image may be compared at block 302 to a threshold which may be associated to the print engine, such as the circumference of the imaging drum 214, the length of the blanket belt 252, or a threshold which is to be respected for printing.

If the length of the image, which may also be the result of a composition of input images, is greater than the threshold, the image may be subdivided at block 304 into a plurality of print frames, each print frame having length equal to or less than the threshold. This operation may be performed by the system controller 102 or by the print controller 110, according to the particular implementation.

At block 306 a digital image processing technique is used. For example, a stitching operation may be performed on at least two consecutive print frames, so as to cause the consecutive print frames to appear adjacent to each other without visible seams. The stitching operation may be obtained, for example, by modifying boundary regions in the consecutive print frames to obtain seamless boundaries between the consecutive print frames. The stitching operations may be performed by the system controller 102 or by the print controller 110, according to the particular implementation. Stitching, which may be based on blending techniques, may provide modifications of some regions of print frames. These stitching regions may be overlapping regions of different print frames taken from the same image or sequence of images.

In some examples, e.g., when stitching images have white areas or solid black areas, techniques different from blending may be adopted. In some examples, the system controller 102 or the print controller 110 may also recognize that blending is or is not necessary for a particular composition of images depending on the nature of the stitching area.

In some examples, operations performed at block 304 may be strictly related to operations performed at block 306. For example, at block 304 an image may be subdivided by choosing the print frames that are most preferable for the stitching operations of block 306. Seam carving may be performed at block 304 or 306 to identify the most appropriate boundaries between print frames. The most appropriate boundaries may be the boundaries that are better suited to stitch together different areas of an image. Therefore, the operations performed at block 304 may be specifically adapted to better support the subsequent operations of block 306.

At block 308 the print engine is controlled to sequentially print the at least two stitched consecutive print frames on the substrate 227.

In some examples, at block 304 overlapping areas are identified between different print frames and are modified at block 306 so that, during print, the overlapping areas are superposed to each other. Accordingly, the printed image may be recognized as seamless by human eye.

Figure 4A:
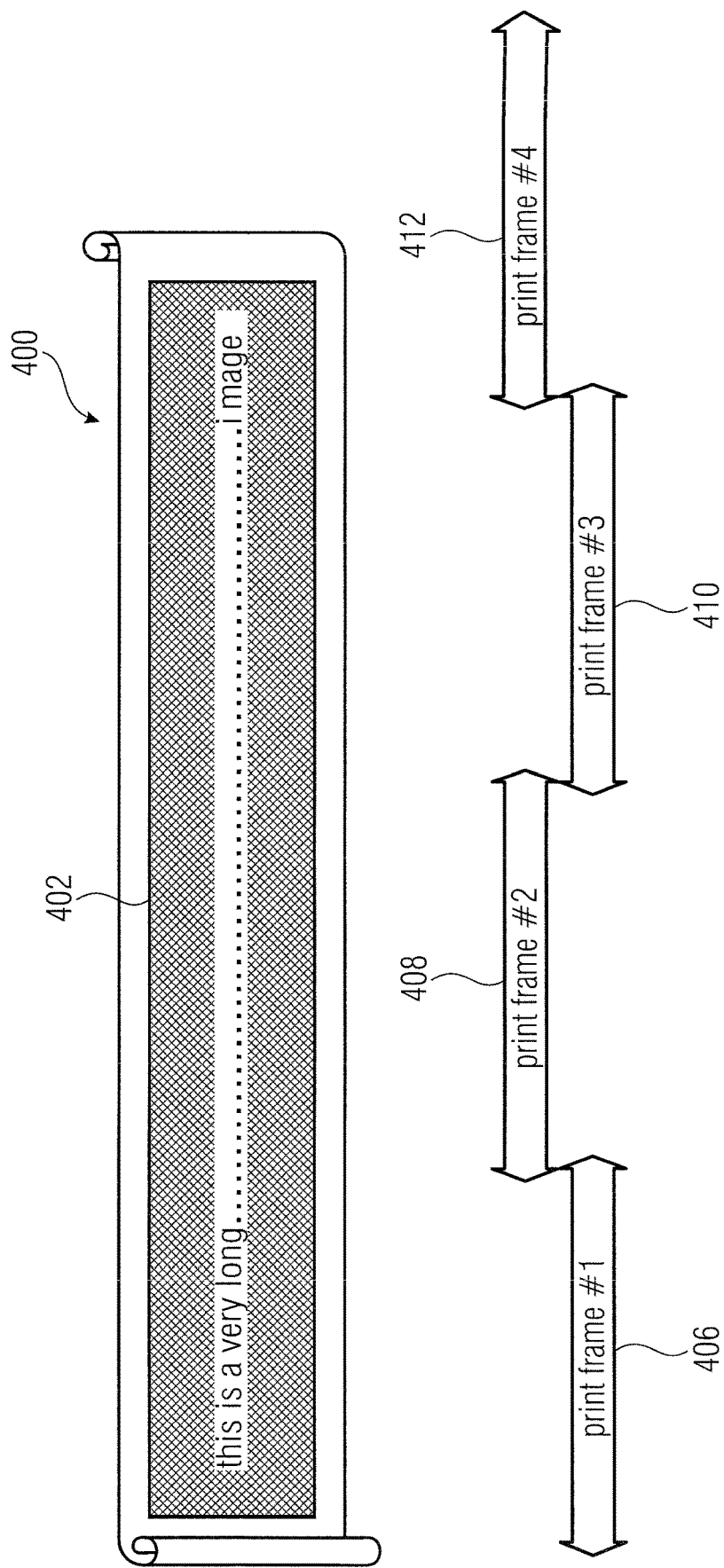
FIGS. 4a-4d show a method for determining print data according to an example.

FIG. 4a shows a banner 400 manufactured, for example, using the system 100 and one of the engines 204 and 204', or the method 300. The banner 400 may be obtained by transferring an image 402 onto substrate 227 (e.g., a long sheet of paper). The horizontal direction in FIG. 4a is the length direction, which is parallel to the feeding direction F in FIGS. 2a and 2b. The vertical direction in FIG. 4a is the width direction of image 402.

FIG. 4a shows that the length of the image 402 is greater than the maximum length of the frames supported by the print engine: the image is therefore divided into consecutive images to allow to print each image. Each of the resulting images is a print frame which has a format adapted for the print engine, and in particular has a length equal to or less than the threshold.

The original image is subdivided into a number of consecutive images (print frames 406, 408, 410, 412), which in this case are four in number. Each print frame has length equal to or less than the threshold. In this particular case, "print frame #4" (412) has an image with a reduced length with respect to the "print frame #2" (408) and "print frame #3" (410). The length of the print frames in general may vary.

The print frames may be printed sequentially. For example, print may follow a direct sequence, such as: 1) "print frame #1" (406); 2) "print frame #2" (408); 3) "print frame #3" (410); 4) "print frame #4" (412). In some examples, an inverse sequence is followed, "print frame #4" (412) being the first frame to be printed, and "print frame #1" (406) being the last frame to be printed, e.g., when the substrate 227 is fed in the print engine of FIG. 2a or 2b from left to right.

Figure 4B:
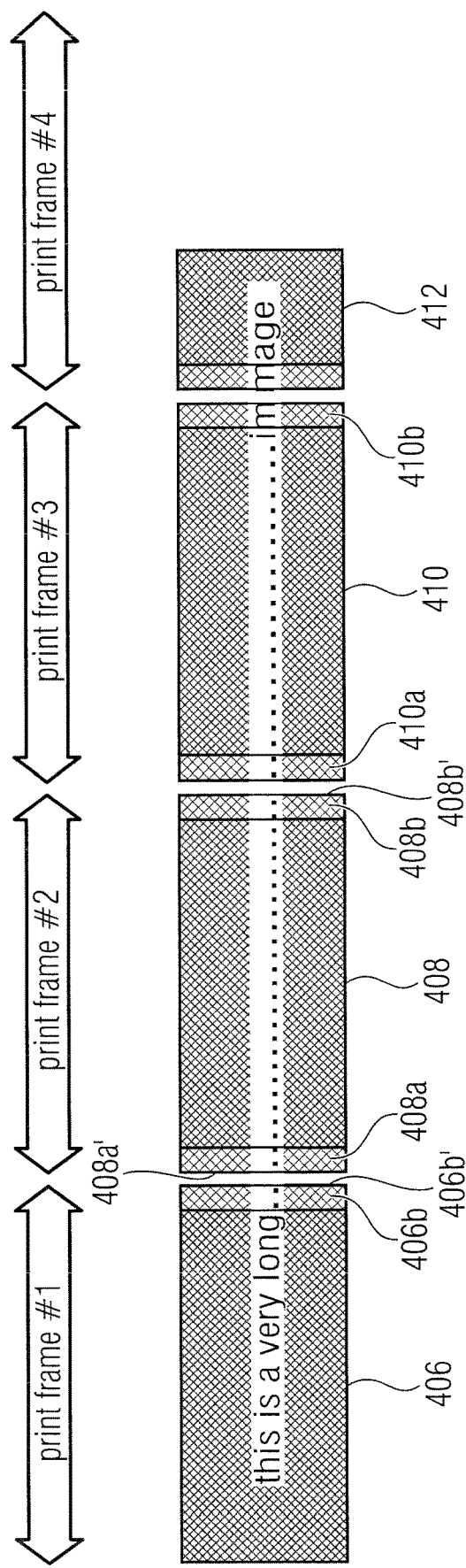

Stitching operations or other digital image processing techniques may be performed to link print frames to each other seamlessly. Stitching may be based on preparing the superposition of overlapping regions of adjacent print frames. Stitching regions may be defined in correspondence with boundaries between two consecutive frames. As shown in FIG. 4b, for print frame 406 a trailer stitching region 406b may be defined, the trailer stitching region 406b ending at a trailing edge 406b'. For print frames 408 and 410, front stitching regions 408a and 410a and trailer stitching regions 408b and 410b may be defined, respectively. A trailing edge 408b' may be defined for stitching region 408b, for example.

With respect to the original image to be printed, some regions of subsequent print frames may overlap some regions of previous print frames. Therefore, some regions of two consecutive print frames may refer to the same parts of the original image. For example, the trailer stitching region 406b of the "print frame #1" (406) may overlap the front stitching region 408a of the "print frame #2" (408). The stitching regions 406b and 408a may correspond to the same portion of the original image, assigned to both the "print frame #1" (406) and the "print frame #2" (408).

When performing stitching operations, the overlapping regions of the print frames may be modified and prepared for being subsequently superposed to each other, during print. For example, the trailer stitching region 406b may be prepared to be superposed to the overlapping front stitching region 408a. Blending techniques may be implemented to reduce visibility of seams in correspondence with borders between different print frames. Accordingly, the print frames are seamlessly connected to each other.

Figure 4C:
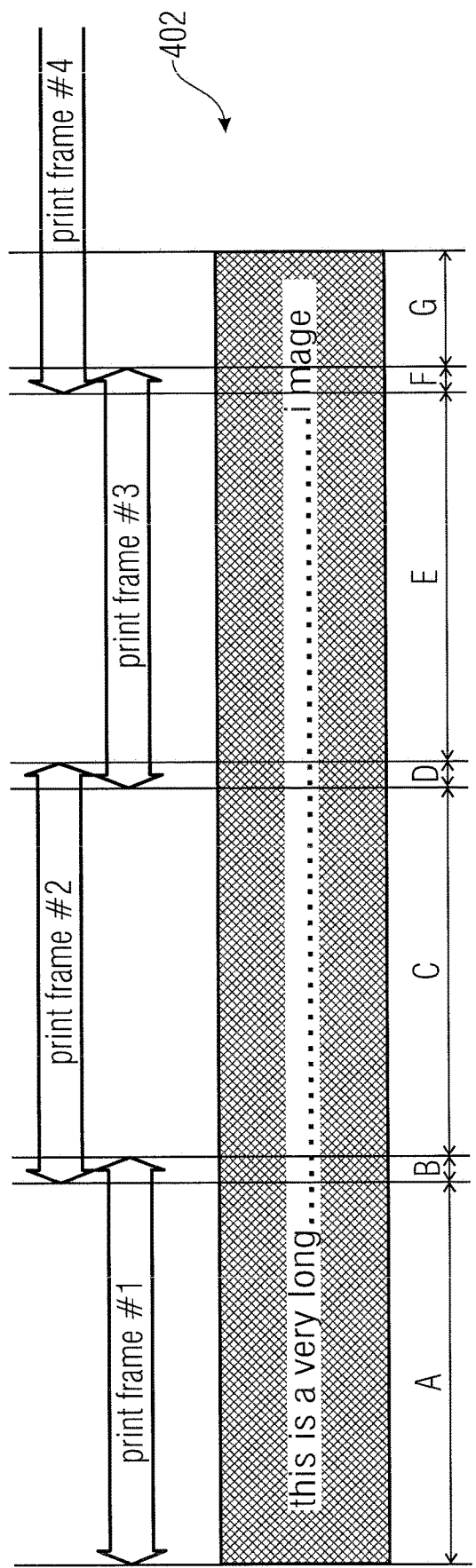

As shown in FIG. 4c, several slices "A", "B", "C", "D", "E", "F", and "G" may be identified in the image to be printed. In particular, slice "A" is formed by pixels which are pixels of the "print frame #1" (406). Similarly, slices "C", "E", and "G" are formed by pixels which are not in overlapping regions between different frames. Slice "B" is formed by pixels in the region in which the "print frame #1" (406) and the "print frame #2" (408) overlap. Similarly, slices "D" and "F" are only formed in regions in which different frames overlap.

The controller 102 or 110 may control the print engine so that slices "C", "E", and "G" are obtained with one single print, while slices "B", "D", and "F" formed by the superposing different stitching regions. Each of slices "B", "D", and "F" may therefore be obtained by printing a same region twice.

Figure 4D:
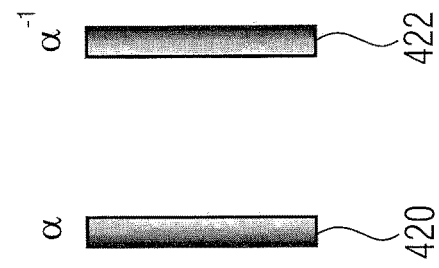

Alpha-blending techniques may be used for performing stitching. Pixel values of slices "B", "D", and "F" may be scaled, e.g., by multiplication, with Alpha (or α)-values which vary in the direction of length of image 402. α-values may be decreasing (e.g., from 1 to 0) for trailing regions, and may be increasing (e.g., from 0 to 1) for front regions. FIG. 4d represents α-values as shades of grey. In particular, reference numerals 420 and 422 refer to intensity values associated to direct or inverse α-values. For example, if α decreases linearly from 1 to 0, the inverse alpha value may be defined as $\alpha^{-1}=1-\alpha$. The dimensions of blocks 420 and 422 may be the same as the dimensions of slices "B", "D", and "F". A suitable technique is discussed step-by-step.

As shown in FIG. 4d, "print frame #1" may be printed so that:
  slice "A" is printed in a blank part of the substrate; and
  a first version of slice "B", in which the pixels are multiplied by α, is printed in a blank part of the substrate.
Analogously, "print frame #2" may be printed so that:
  a second version of slice "B", in which the pixels are multiplied by $\alpha^{-1}$, is printed over the first version of slice "B";
  slice "C" is printed in a blank part of the substrate; and
  a first version of slice "D" in which the pixels are multiplied by α, is printed in a blank part of the substrate.
Further, "print frame #3" may be printed so that:
  a second version of slice "D", in which the pixels are multiplied by $\alpha^{-1}$, is printed over the first version of slice "0";
  slice "E" is printed on a blank portion of the substrate; and
  a first version of slice "F" in which the pixels are multiplied by α, is printed on a blank portion of the substrate.
Finally, "print frame #4" may be printed so that:
  a second version of slice "F", in which the pixels are multiplied by $\alpha^{-1}$, is printed over the first version of slice "D"; and
  slice "G" is printed on a blank portion of the substrate.

A visibly seamless boundary between the print frames is therefore obtained.

Where each pixel is associated to a tuple of values is provided, e.g., (C, M, Y, K), each element of the tuple corresponding to a colorant, alpha-blending may be performed by applying coefficients α and $\alpha^{-1}$ for each colorant value for each pixel.

Blending techniques may be applied to contone data or halftone data. For example, contone data may be blended using alpha-blending. Halftone data may be blended by using laser power blending (e.g., for print engine 204) or nozzle blending (e.g., for print engine 204'). Halftoning may be performed by either of controllers 102 and 110 or by a processor associated to the print engine. The stitching techniques may be performed by any of controllers 102 and 110, according to the particular implementation.

The print frames may in general have different lengths with respect to each other. In some examples, the print frames have the same length, e.g., to conform to a particular format or to physical properties of the print engine. The print frames may be defined by the front position and the trailer position of each print frame.

It is therefore possible to implement automatic techniques which achieve the best subdivision in print frames for an image. Seam carving techniques may be used, which retrieve the most preferable breaking line in the image.

A seam carving operation, e.g., performed by the controller 102 or 110, may establish the least visually important image path in an image or in a composition of images. For example, a least visually important image path may be searched in a stitching area for blending two frames. The least visually important image path has pixel data that can be easily modified in two consecutive print frames with some placement error between them. A least visually important image path may cross an image in the width direction (vertical in FIGS. 4a-4c). The least visually important image path may be established by analyzing a cost function. The cost function may be tuned to find the most appropriate place for stitching. For example, a path that has no ink deposited on, a path with high noise content, a path along visible image edge, may result good candidates for defining a stitching area.

The subdivision of the image into a plurality of print frames may be operated color-by-color. Applying seam carving to different colors, for each color a different subdivision into print frames may be defined. Stitching and blending techniques may also be performed for each color. It is possible to define different alpha coefficients for different colors at block 304 or 306 on the basis of a least visually important image path identified with seam carving. The operations performed by the print engines 204 or 204', included the operations defined for method 300 of FIG. 3, may therefore repeated for each color.

Figure 5A:
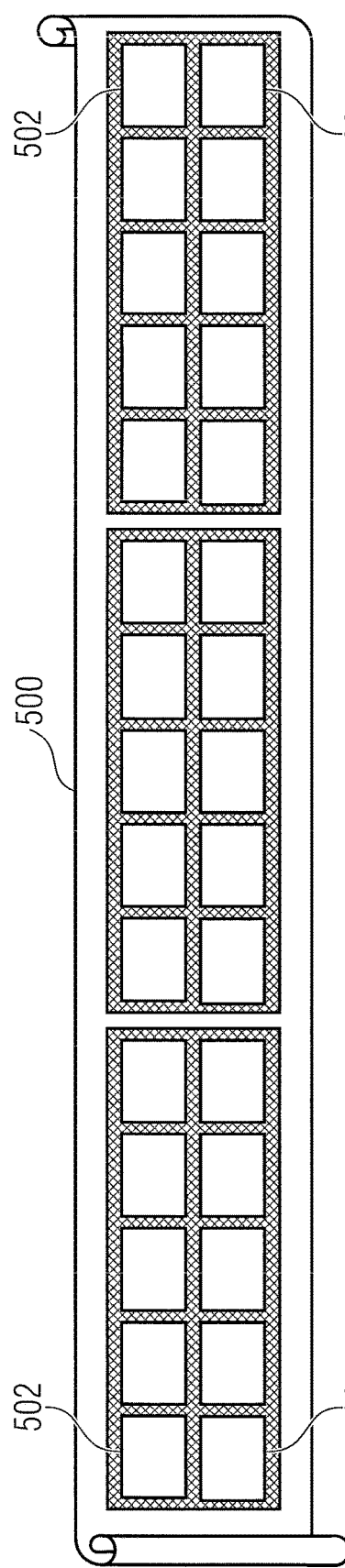
FIGS. 5a-5c show another method for determining print data according to an example.
Figure 5B:
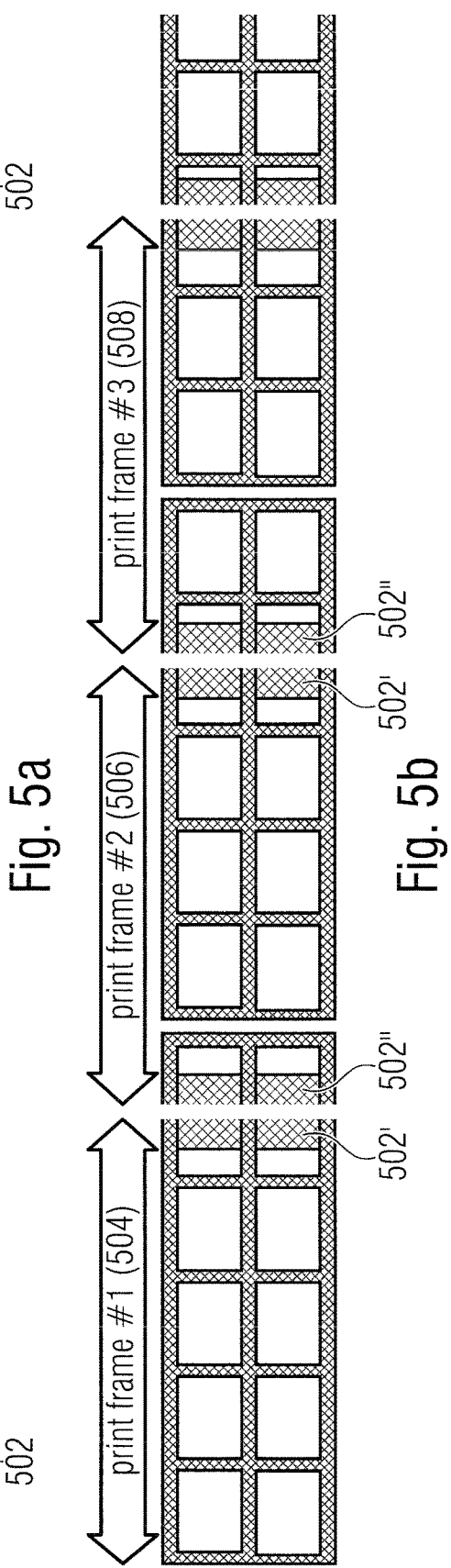
Figure 5C:
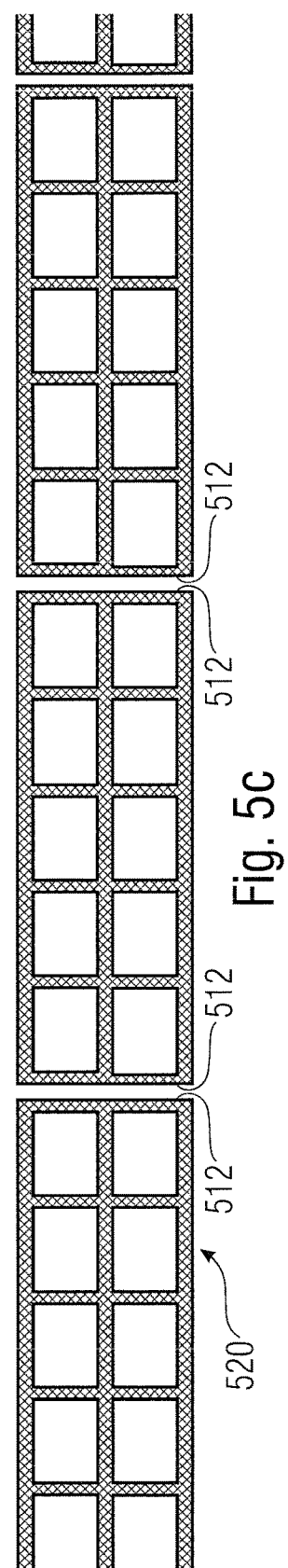

FIGS. 5a-5c show how to print a sequence of images on a substrate 500. A multiplicity of images 502 is to be printed. As shown in FIG. 5a, in general each image 502 is printed on a substrate having a length which is not necessarily a submultiple of an assigned length threshold for print frames. For example, by printing the sequence of images without inserting additional spaces, some of the images 502 may encounter the seam region 242 or 242' of FIGS. 2a and 2b.

It is possible to print the complete sequence of images 502. The images 502 may be composed to each other to form a long image which is subdivided into a plurality of frames, each frame having the same length as or a length less than a maximum threshold. As shown in FIG. 5b, an image 502 may be simply automatically divided between a first part 502' which is part of the "print frame #1" (504), while the remaining part 502" is part of the "print frame #2" (506). The same applies to the images 502 which are divided between the "print frame #2" (506) and the "print frame #3" (508).

Stitching techniques may be implemented as discussed above, e.g., by blending overlapping regions so as to superpose pixels to each other. Seam carving techniques may be applied to search for the optimal boundaries of the print frames. It is possible to modify the alpha coefficients in regions 420 and 422 to better link the images to each other. Accordingly, a user may be provided with an automatic tool for locating the print frames, their boundaries, and for performing the most appropriated blending and, consequently, for printing a sequence of an undetermined number of images image without seams to the images.

It is possible to define a fixed length for the length of the print frames.

The operations for controlling the print of the sequence of images 502 may be the same as those implemented for the banner 400, for example following the method 300 of FIG. 3. The fact that images 502 are composed to each other, and form a long sequence, may have no effect on subdividing the sequence of images, on stitching, and on printing.

In subsequent procedural phases, images 502 may be cut in correspondence with their borders which keep in account the original shape of images 502, so as to obtain a plurality of images 502, some of which having invisible seams. For example, panels 520 may be obtained, each panel comprising the same number of images 502. Panels 520 may be cut at preferable locations 512 in a manner unrelated to the previous subdivision into print frames, stitching operations, blending, operations, and superposition of stitching regions during print.

Each panel 520 has, in the example of FIG. 5c, ten images 502. As may be understood from FIG. 5a. Otherwise, only eight images 502 would have been printed for each panel, as a consequence of the threshold imposed to the length of the print frames.

In some examples, seam carving permits to automatically recognize the borders outside images 502, so as to define the boundaries of the print frames outside the images 502: several least visually important image paths may be retrieved outside the images 502, while the pixels of images 502 may be associated to a considerable energy.

In some examples, e.g., when the images to be printed are not all the same, it is possible to automatically modify in real time the sequence of images: while print frames are printed, new images may be added to a queue; new print frames may be identified and inserted into a printing queue. Where necessary, seam carving, stitching and blending operations may be operated in real time, as well.

Basically, a virtual print frame may be obtained. The virtual print frame be a queue or a buffer of print frames to be sequentially printed. The queue may be adjourned with the insertion of additional images 502, which may be understood as portions of a long, virtually endless image, inserted at some time instants into the queue. The system controller 102 or the print controller 110 may reorganize the queue in real time to adapt the queue to the evolution of the sequence of images to be printed. If required, the relative positions between images to be printed may be varied to maximize the benefit, e.g., by composing the images to each other so as to reduce the number of seams, or to reduce the seam visibility, or in accordance to a given priority, and so on.

Figure 6A:
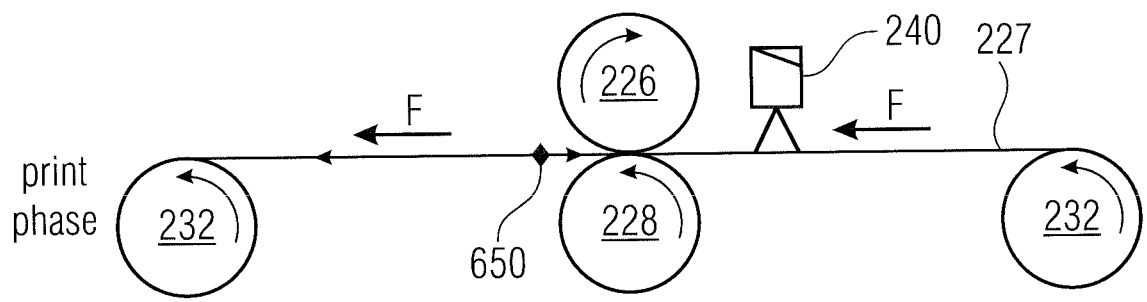
FIGS. 6a-6c show a method for aligning different print frames according to an example.
Figure 6B:
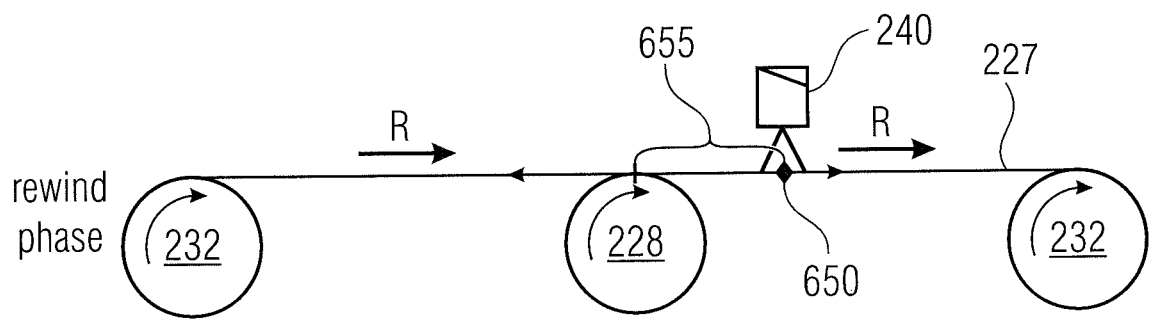
Figure 6C:
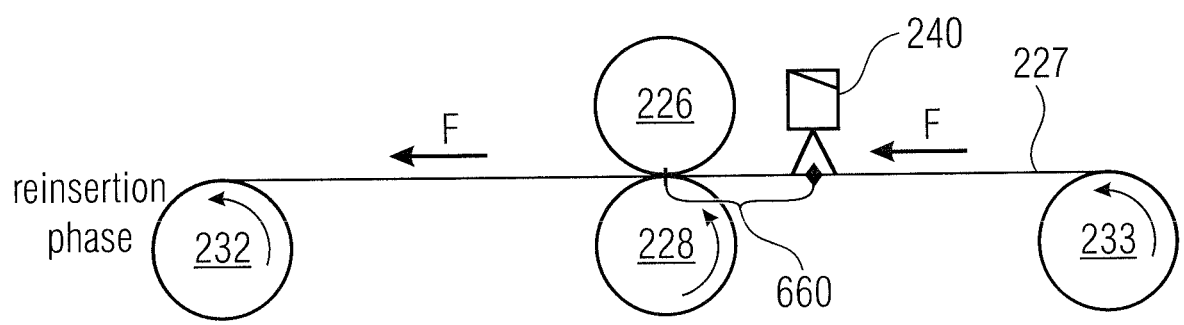

FIGS. 6a-6c show a procedure which may synchronize a new print on pre-printed media and to control a real-time automatic media-feeding. This procedure, which may comprise multiple phases, may align subsequent print frames to each other in the laser print engine 204 of FIG. 2a or the ink-jet print engine 204' of FIG. 2b.

At first, a print phase may be performed. A first print frame (e.g., "print frame #1" 406 of FIG. 4a or 4b) is printed at the position of the drums 226 and 228. The trailer edge 406b' of the first print frame is marked, e.g., by printing a mark or sign 650 in a sacrificial part, such as a border, of the substrate 227, or by otherwise labelling the position of the trailer edge 406b' of the first print frame.

Subsequently, a rewind phase may be performed. The substrate 227 is moved back (e.g., rewound) in the direction R antiparallel to the feeding direction F, without transferring ink to the substrate (e.g., by moving the ITM drum 226 away from the substrate 227). The backward movement may end when the sensor 240 recognizes the mark 650 on the substrate 227, or when the sensor 240 recognizes that the mark 650 is at a certain distance from the drums 226 and 228. This distance, which is indicated by numeral 655 in FIG. 6b, may correspond to the trailer stitching region 406b (FIG. 4b), which is already printed and needs to be being superposed by the front stitching region 408a.

Subsequently, a third phase (re-insertion phase) may be performed. A printing activity may restart as shown in FIG. 6c (e.g., by pressing the ITC drum 226 to the IMP drum 228 so as to transfer an image to the substrate 227). The portion referred to with numeral 660 corresponds to the front stitching area 408a (FIG. 4b) which shall superpose the already printed trailer stitching region 406b (e.g., to form slice "B" in FIG. 4c or as indicated with 655 in FIG. 6b).

In some examples, operations described above may be repeated for each color to be applied to the substrate 227. It is in fact in general possible to define different subdivisions of print frames for different colors. Alternatively or additionally, it is possible to modify a stitching region of a same frame differently for different colors, e.g., by adopting different alpha coefficients for different colors. Where seam carving algorithms are implemented, different seam carving algorithms may be applied to different colors. It is therefore possible to repeat the proceedings above to superpose stitching areas in different colors. Hence, each phase may refer to a single colorant.

In operations such as rewinding the substrate may be operated automatically in combination with the marking device and the mark detector so as to achieve an automatic one-shot process. The print controller 110 (or in some cases the system controller 102) may control these operations, which, in some examples, may be performed without human supervision. The trailing edge mark detection may help to improve the accuracy of stitching a next frame leading edge to a previous frame trailing edge. It is possible to control the substrate movement according to better establish the printing position, e.g., to better retrieve the mark 650 so as to start printing a new frame in the appropriated position. It is possible, for example, to obtain a feedback value associated to the laser beam. In implementations in which the laser beam 219 may be shifted, e.g., through an orientable mirror in the laser imaging unit (writing head) 218, an accurate control of the printing position may be obtained by controlling the mirror inclination on the basis of a feedback value associated to the inclination of the mirror. This feedback value may be obtained by measuring a detection light beam irradiated on a surface of the mirror and by measuring the inclination of the reflected detection light beam. A feedback value may also be obtained as a value associated to the rotation of the imaging drum 214, so as to rotate the mirror accordingly. More in general, it is possible to control the laser beam or ink jet timing, or by shifting the laser beam using timing and dynamic mirror.

Figure 7:
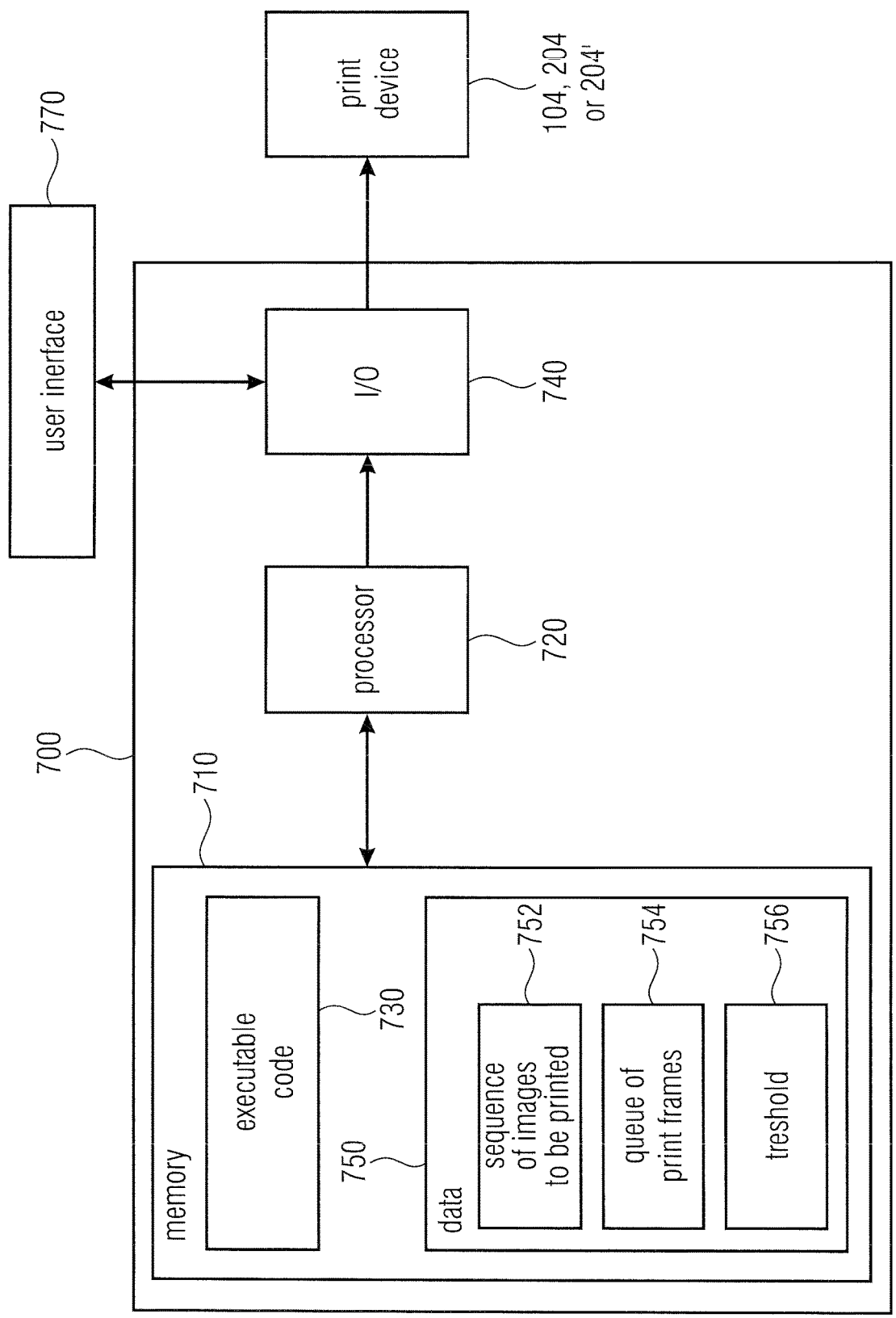
FIG. 7 shows a computer system according to an example.

FIG. 7 shows a system 700 which may be an example of the system controller 102, the print controller 110, or which may have the functions of both of them. The system 700 comprises a processor 720 and a memory 710 which contains executable code 730 which, when executed by the processor 720, cause the processor to perform at least one of the print operations described above. The processor 720 may be connected, e.g., through an I/O device 740, to a user interface 770 and/or to a print device (which may be one of the print engines 104, 204, or 204').

The memory 710 may contain a data space 750 with data for the processor 720. The data space 750 may contain a sequence of images 752, e.g., the sequence of images 502, or a long image, e.g., 402. The data space 750 may contain a queue 754. The queue may define a collection of print frames, each having the length less than a threshold (e.g., a threshold associated to one of the print engines 104, 204, or 204'). When a print frame is printed, it is deleted from the queue, and the subsequent print frame becomes the first print frame in the queue. The processor 720 may define, redefine, and modify the print frames in the queue on the basis of several criteria, such as the preferred boundaries between the print frames, according to priorities, and so on. The processor 720 may also modify the pixel values of the print frames, e.g. by performing stitching techniques (e.g., blending techniques) at the boundaries between proximate print frames.

The processor may also save in the memory 710 data 756 associated to the print device, such as the threshold, which may be inserted in an initialization phase to associate the threshold to the specific print device. Accordingly, it is possible to use the same system 700 for different print devices, hence increasing the operability of the system.

The images and the print frames may be stored according to formats (bitmaps, vectorial maps, and so on) for storing images in memory devices. In the sequence of images, however, metadata may be saved to maintain information, such as the original borders of the original images (e.g., 502), or cut locations (e.g., 512) to control cutting devices which subsequently define the final borders of the printed images.

During print, the processor 720 may insert new images to be composed to the sequence of images to be printed 752. The processor 720 may also reorganize the queue of print frames 754 and modify the frames (e.g. by searching for new preferable borders, or reordering the queue, or by blending frames, or by performing seam carving routines). The queue may be contain pointers to memory locations associated to images, or portions of images (e.g., print frames), to portions of the print frames (e.g., stitching regions, slices "A"-"G" in FIG. 4c, and so on). The queue may comprise an array of data associated to the image, images or portions of images, or to particular pixels or groups of pixels within the print frames. The queue may be in the form of a First-In-First-Out (FIFO) list, the processor 720 being, in some examples, entitled to modify the order. The queue may be also be obtained with other data structures adapted to store and modify images.

A user, in general, does not need to cope with any of these operations or data structures. The user only needs to know the list (or sequence) of images to be printed, without necessarily having information on the seams between the print frames.

In some examples, it is possible to use a page composition system, e.g., implemented in the controller 110. The page composition system may divide an image to be printed into a plurality of bands. The page composition system may associate a plurality of images to be printed to positions in the bands. In order to define each band, element descriptors may be use. An element descriptor may be a data structure which associates, to the pixels of each band, relevant positions of the images, e.g., the starting position of each image, such as the position of the upper-left corner of the image. When bands are defined, it is possible to perform an association between bands and print frames: a band may be a print frame; a band may be a group of consecutive frames may be; or a group of consecutive bands may form a print frame. It is possible to perform operations such as stitching, blending, seam carving, and sequential print to the bands or print frames. The relevant positions of the images in the band may also be included in the data 752 or 754.

The user may define a print job with virtual frames which are later processed by the printing device into frames that will accommodate the seam limitations and the overlapping and stitching requirements.

Operations of a page composition system are shown in FIGS. 8a-8d. The page composition system may use images stored in memory (e.g., memory 710), a clean memory buffer and a list of element descriptors in order to compose image elements into a new image. The page composition system may perform the composition of image elements according to the order in which they are listed. The element descriptor may include data about the source image element including crop, rotation, mirroring, color conversion and other operations, a possible alpha channel attachment, a blending function and a destination location in the composed image. The composed image buffer is cleaned before page composition is started. Each new element is added on top of the already composed image, e.g., using a blending operation defined for that element. In case of very large images, the image may be broken into image bands or tiles, and, then, combined into the larger image.

Figure 8A:
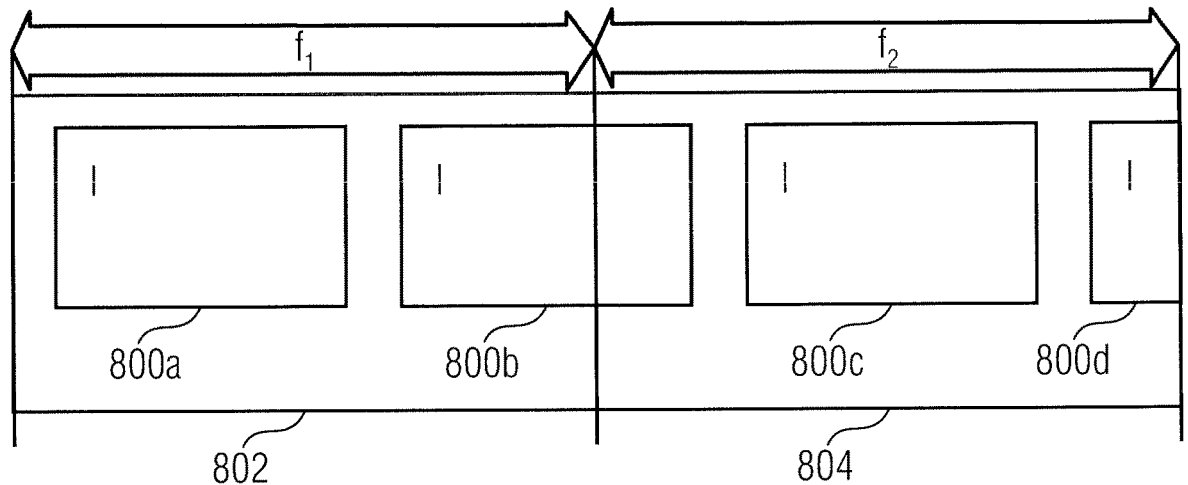
FIGS. 8a-8d show another method for determining print data according to an example.

FIG. 8(a) shows an image "I" printed in multiple instances 800a, 800b, 800c, 800d, etc., by a print press. The size of the maximum printing frame is enough to fit more than one instance of the image "I", but less than two instances. By accepting to print only one single instance of image "I" in one single print frame (which may be a page), productivity is low. In this case, productivity may be measured as the quotient between the length of image "I" expressed as Length(I) and the length of the threshold for the length of the print frame (page length), expressed as Length (frame). Hence, it may be calculated:

$$\text{productivity} = \frac{\text{Length}(I)}{\text{Length}(\text{frame})}$$

As may be appreciated by FIG. 8a, as the length of "I" is much less than the maximum length of the frame, productivity is low.

To enhance productivity, the following element description list is created (see FIGS. 8a-8d) to print three instances (800a, 800b, etc.) of image "I" at a distance "d" along the feeding direction F.

TABLE 1

| | | | | Element description list | | | |
|---|---|---|---|---|---|---|---|
| Elem. | Source image | Source Left crop | Destin. Length | Destination Left offset | Alpha Channel | Blending | Frame |
| E | I | 0 | Length(I) | d | 1 | none | f1 |
| A | I | 0 | Lenglh(A) | 2d + Length(E) | 1 | none | f1 |
| B | I | Length(A) | Length(B) | 2d + Length(E) + Length(A) | α(B)− | normal | f1 |
| B | I | Length(A) | Length(B) | 0 | α(B)+ | normal | f2 |
| C | I | Length(A) + Length(B) | Length(C) | Length(B) | 1 | none | f2 |
| E1 | I | 0 | Length(I) | Length(B) + Length(C) + d | 1 | none | f2 |
| Next element (800c) | . . . | . . . | . . . | . . . | . . . | . . . | . . . |

TABLE 2

Length of and rewind for each frame

| Frame | Length | Rewind |
|---|---|---|
| f1 | Max | 0 |
| f2 | Max | Length(B) |

Figure 8B:
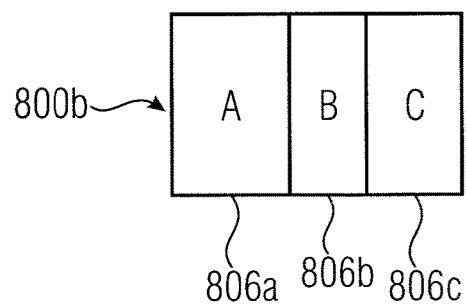

As shown in FIG. 8b, the second instance 800b of image "I" is broken into three elements "A" (806a), "B" (806b), and "C" (806c). In this case, element "B" is the overlapping element, corresponding to slices "B", "D", and "F" in the example of FIG. 4c. Print frame "f1" is referred to with 802 and the subsequent print frame "f2" is referred to with numeral 804.

Before printing frames "f1" and "f2", alpha blending between the overlapping frames is performed. The best stitching path or boundary line, indicated by line 810, is retrieved inside the stitching area, which may be element "B" (806b), by analysing the pixel values of element "B". A seam carving technique may be used for this purpose.

Figure 8C:
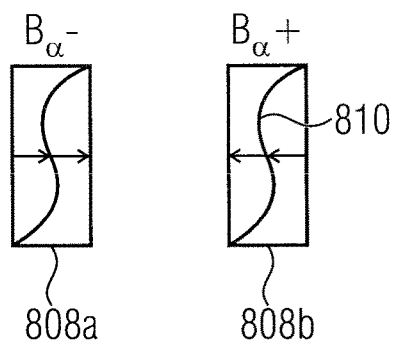

As shown in FIG. 8c, two complementary alpha channel elements "Bα–" and "Bα+" (808a, 808b) are built with the dimensions of element "B". For example, "Bα–" may provide higher weight to pixels on the left of the stitching line 810 and lower on the right, while "Bα+" may complement the values to a total of 1. In FIG. 8, the direction of the arrows indicate a diminution of the absolute magnitude of the alpha values.

Figure 8D:
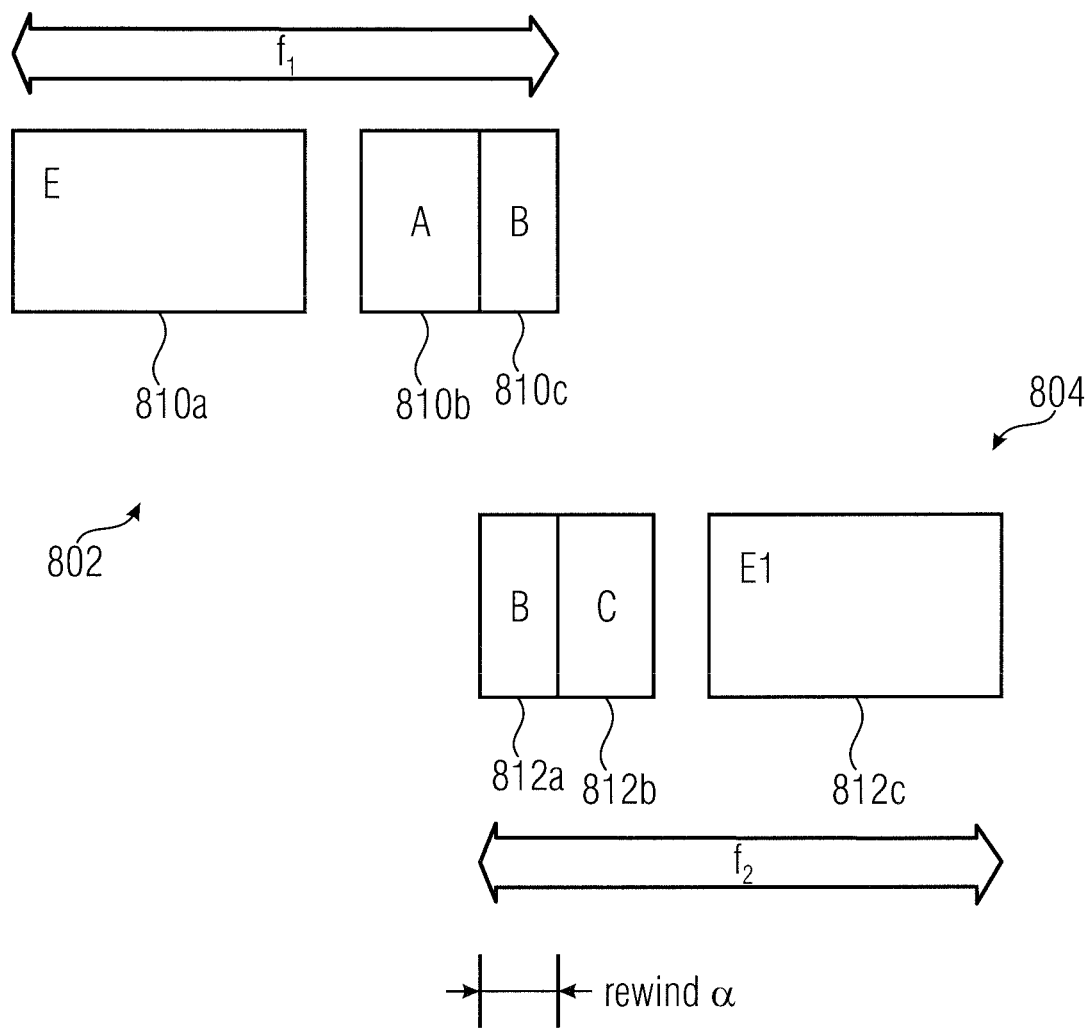

As shown in FIG. 8d, frame "f1" (802) contains elements "E" (810a), "A" (810b), and "B" (810c). Element "E" corresponds in this case to one instance of image "I". In order to print frame "f1", element "B" (810c) may be obtained by scaling the pixel values of original element "B" (806b in FIG. 8b) using the coefficients of "Bα–" (808a in FIG. 8c). Frame "f1" may be printed.

Subsequently, a rewinding action may be performed (e.g., with the technique illustrated in FIGS. 6a-6c) for the length of element "B". Thereafter, frame "f2" may be printed. In this frame, a new instance of element "B" is printed. This new instance (812a in FIG. 8d) may be obtained by scaling the pixel values of original element "B" (806b in FIG. 8b) using the coefficients of "Bα+" (808b in FIG. 8c). The print of frame "f1" is completed by printing elements "C" (812b) and "E1" (812c).

Accordingly, productivity has grown to:

$$productivity = \frac{Length(frame) - Length(B)}{Length(frame)}$$

Systems as discussed above may operate as digital web presses. The system controller 102 or the processor 720 may manage print jobs requested by a multitude of users which are connected through a geographical network, such as the internet, to a particular service provider. Users may subscribe to a service platform which, in turn, may print images on demand. Information about the users (e.g., username, billing and shipping information, and so on) may also be recorded in the data space 750 or in other data spaces associated to the same service provider. According several examples, the processor may reorganize the queue to obtain the requested quality of service and fastest operation. It may be foreseen, for example, that the queue is reorganized so that that images compositions have preferably the same length of the maximum threshold, which permits to minimize the necessity of performing stitching operations to consecutive images.

Accordingly, the page composition system is capable of re-imposing a virtual frame, which may have an unlimited length, onto physical print frames.

Although some aspects have been described in the context of an apparatus, it is clear that these aspects also represent a description of the corresponding method. Some or all of the methods may be executed by (or using) a hardware apparatus, like for example, a microprocessor, a programmable computer or an electronic circuit.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples may be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of method is, therefore, a computer program having a program code for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a computer.

The apparatus described herein, or any components of the apparatus described herein, may be implemented at least partially in hardware.

The methods described herein may be performed using a hardware apparatus, or using a computer, or using a combination of a hardware apparatus and a computer.

The methods described herein, or any components of the apparatus described herein, may be performed at least partially by hardware.

The above described examples are merely illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

The invention claimed is:

1. A method comprising:
   comparing a length of an image with a threshold associated to a print device;
   subdividing the image, along the length of the image, into a sequence of print frames, each print frame having length equal to or less than the threshold;
   performing a stitching operation on at least two consecutive print frames at each of one or more boundaries at which the image has been subdivided into the sequence of the print frames; and
   controlling the print device to sequentially print the at least two stitched consecutive print frames, such that the boundaries are oriented perpendicular to a media advancement direction and adjacent stitched consecutive print frames meet at respective boundaries during printing.

2. The method of claim 1, further comprising marking a trailing edge of a print frame to align a subsequent print frame to the marked trailing edge.

3. The method of claim 1, wherein performing the stitching operation comprises performing a blending operation to stitch the at least two consecutive print frames.

4. The method of claim 1, further comprising defining overlapping portions of the two consecutive print frames,
   wherein the stitching operation is performed to the overlapping portions; and
   wherein controlling the print device comprises controlling the print device so as to at least partially superpose the overlapping portions during print.

5. The method of claim 1, further comprising adding print frames the image responsive to the addition of image portions to be printed.

6. The method of claim 1, further comprising analysing color values of pixels within the image.

7. The method of claim 1, further comprising performing a seam carving operation.

8. A computer-readable storage medium which stores computer readable instructions which, when executed by the computer, causes the computer to:
   manage a queue of print frames obtained by subdividing an image, along a length of the image, into a sequence of the print frames, each print frame having length equal to or less than a threshold maximum length;
   control a sequential print of the print frames so that at least two consecutive print frames stitch with each other at each of one or more boundaries at which the image has been subdivided into the sequence of the print frames, such that the boundaries are oriented perpendicular to a media advancement direction and adjacent stitched consecutive print frames meet at respective boundaries during printing.

9. A system to:
   subdivide an input image, to be printed by a print device according to a format associated to a length threshold, along a length of the input image into a sequence of frames so that each frame has length equal to or less than the length threshold;
   process the print frames so as to modify boundary regions of adjacent frames at each of one or more boundaries at which the input image has been subdivided into the sequence of the frames; and
   command a sequential print of the frames on a substrate so that the boundary regions are superposed to each other, such that the boundaries are oriented perpendicular to a media advancement direction and the adjacent frames meet at respective of the boundaries during printing.

10. The system of claim 9, wherein the system is further to compose the input image from a plurality of images to be printed.

11. The system of claim 9, further comprising a drum-type printer or a belt-type printer.

12. The system of claim 9, wherein the system is to mark a trailing edge of a frame so that a sensor detects the marked trailing edge to perform an alignment of the frame to a subsequent frame.

13. The system of claim 9, wherein the system comprises a moving unit to move the substrate according to a forward direction and a backward direction to align a subsequent frame to a previous frame.

14. The system of claim 9, wherein the system is to control the position of a next image frame according to the trailing edge marks by performing a timing control, a position control, or a laser beam position control.

15. The system of claim 9, further comprising a page composition system to re-impose virtual print frames onto physical print frames.

* * * * *